FIG 1_f

United States Patent Office 3,799,825
Patented Mar. 26, 1974

3,799,825
HOSES AND PIPES
Jacques Champleboux and Robert Delaux, Clermont-Ferrand, France, assignors to Pneumatiques Caoutchouc Manufacture et Plastiques Kleber-Colombes, Colombes, France
Continuation-in-part of application Ser. No. 99,628, Dec. 18, 1970. This application Feb. 24, 1972, Ser. No. 228,906
Int. Cl. F16l 11/08
U.S. Cl. 156—144  5 Claims

ABSTRACT OF THE DISCLOSURE

This invention relates to a method of manufacturing a hollow tubular member such as a pipe, hose, sheath or the like, in which at least one layer of helically-wound parallel cables is applied to a rubber cylinder. In accordance with the invention, said layer is formed by placing on the rubber cylinder parallel to its axis and over its whole periphery, bands formed by segments of cables embedded in rubber, said segments of metal cables of said bands being mutually parallel and making with the longitudinal direction of said bands an angle equal to that which said bands make with the axial direction of said hollow member.

---

Figure 1:
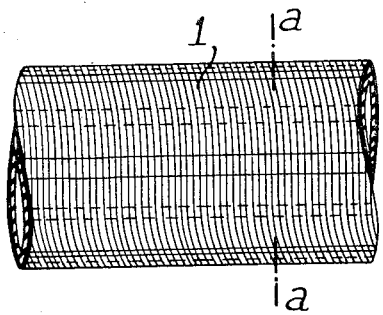

This application is a continuation-in-part of prior co-pending application Ser. No. 99,628, filed Dec. 18, 1970.

The present invention relates to a method of manufacturing pipes and hoses, tubular sleeves or the like from reinforced rubber, the reinforcement of which comprises at least one layer of helically-wound metal or textile wires or strands, hereinafter referred to simply as cables. The invention relates in particular to the manufacture of such of these articles as have a shape and dimension such that they are difficult to manufacture by processes at present known and utilized in the rubber industry.

The articles comprising at least one layer of helically-wound metal wires, cables or strands, capable of being manufactured by the method according to the invention, are very varied. Thus, it allows the simple manufacture of flexible pipes and hoses having bellows or undulations adapted for use in dredging machines, or expansion sleeves intended to be located between the ends of metal piping in order to absorb expansion, vibration or misalignment; due to their undulated shape, these pipes and hoses are not very suitable for manufacture by methods known at this time.

In order to simplify and clarify the description which is to follow, different terms and expressions which will be used hereinafter are defined as follows:

The expression "laying angle" of a cable signifies the angle which the cable will make with the axial direction of the pipe or hose; the expression "crossed layers" signifies superimposed layers each formed of parallel elements, the laying angle of these elements of one layer being equal but in the opposite direction to that of the elements of the other layer; the expression "rubber" shall include all supple and elastic materials which are convenient for use in practising the invention.

All the methods utilized at present for manufacturing hoses and pipes comprising one or more layers of helically-wound cables of continuous length, consists in winding the cables in helices whose pitch, having regard to the diameter of the article, corresponds to the selected laying angle.

These methods, in which there are communicated to the article and to the point of application of the cable on the article, rotary and translatory movements, one with respect to the other, are perfectly suitable for laying the cables on cylindrical pipes or hoses. On the other hand, if these pipes and hoses comprise undulations or bellows, it is no longer convenient because in these undulations or bellows, either the pitch of the helices remains constant and it is the laying angle which varies, or else the laying angle remains constant and it is the pitch which varies.

One object of the present invention is a method which will allow the manufacture without difficulty of all kinds of pipes and hoses or sleeves from rubber reinforced with metal cables, particularly when they include bellows or undulations.

It is a further object of the invention to permit the manufacture of such hoses and pipes with very simple and convenient means.

The method according to the invention consists in making the reinforcing layer or layers constituted by helically-wound cables by locating several rectilinear bands constituted by segments of parallel cables embedded in rubber and inclined with respect to the longitudinal axis of these bands at an angle equal to the laying angle parallel to the axis of the pipe or hose and around the whole periphery of the latter.

If, in practising the invention, a single reinforcing layer is to be used, the bands will be covered at their lateral parts and the covering width, which should be able to resist all stresses to which the layer is submitted, will depend on the extent of such stresses, on the adherence existing after vulcanization between the cables and the rubber, and on the resistance of the vulcanized rubber covering the bands.

If, in practising the invention at least two superimposed layers are to be employed, a similar operation as above-described may be effected by covering the bands constituting each layer but also simply these bands of one layer may be juxtaposed, the bands of the layer situated below or above thus being staggered with respect to the bands of the first layer.

Figure 1A:
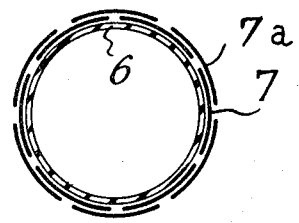
Figure 2:
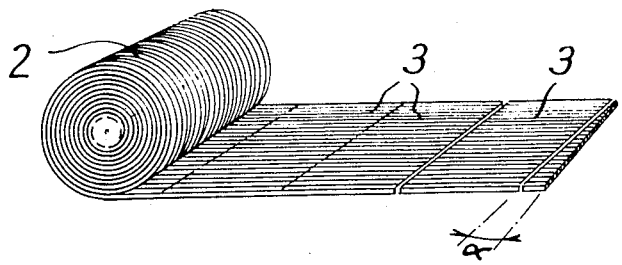
Figure 1B:
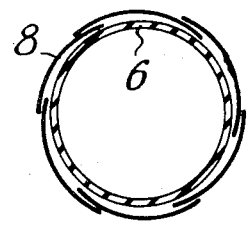
Figure 3:
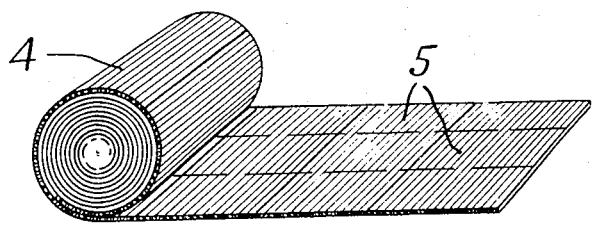
Figure 1C:
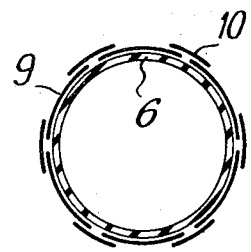
Figure 1E:
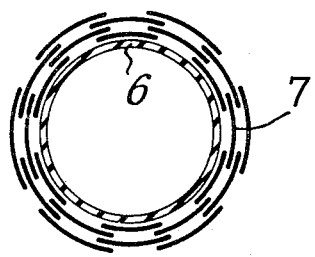
Figure 4:
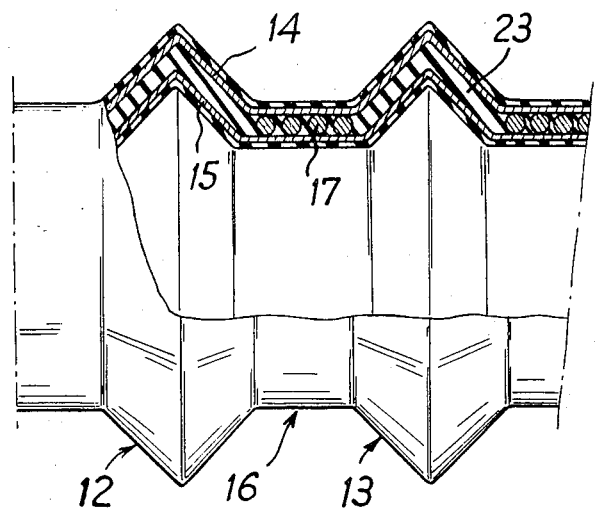
Figure 5:
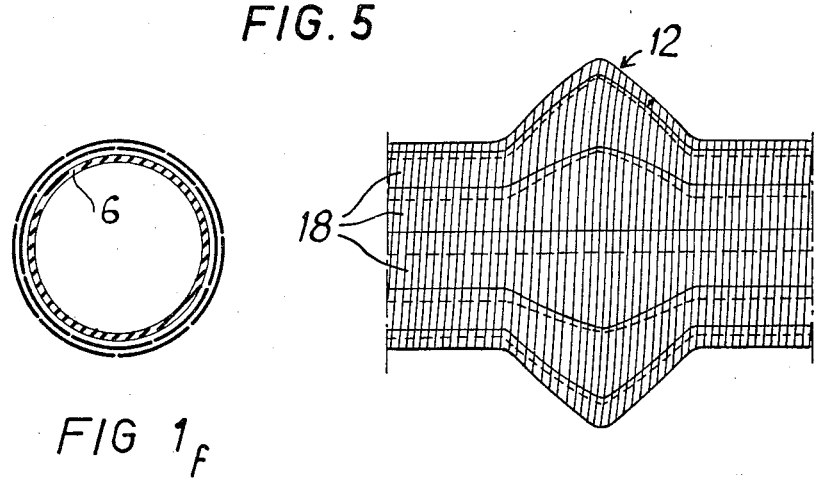
Figure 6:
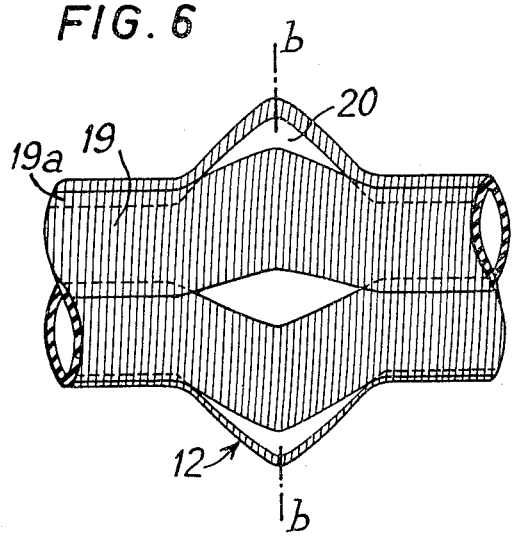
Figure 6A:
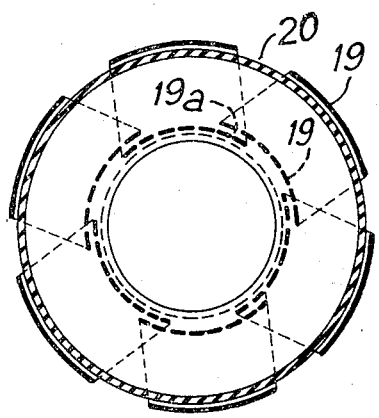
Figure 7:
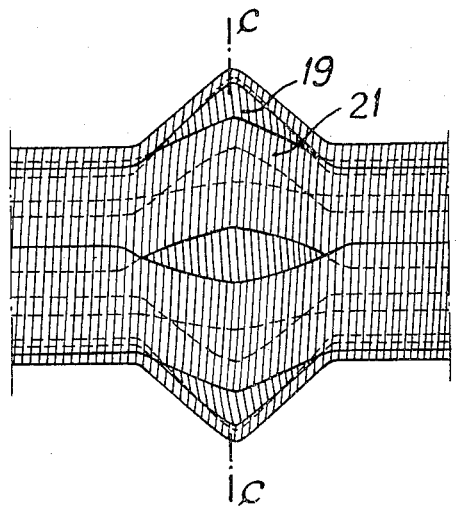
Figure 7A:
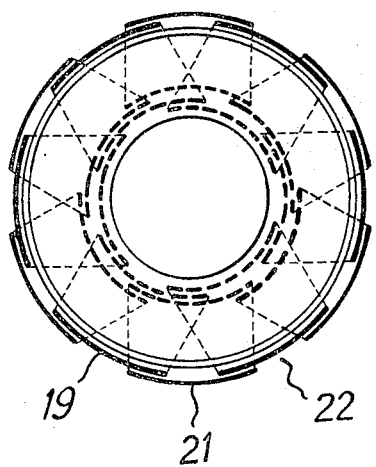

In order that the invention may be more clearly understood, reference will now be made to the accompanying drawings which show certain embodiments thereof by way of example, and in which:

FIG. 1 shows part of a reinforced rubber hose or pipe during its manufacture according to the present invention, FIG. 1a is a cross-section along the line a—a of the hose or pipe shown in FIG. 1, FIGS. 1b–1d are cross-sections of a hose or pipe similar to that shown in FIG. 1, FIG. 1e is a cross-section of a pipe or hose similar to that shown in FIG. 1 but in which the reinforcement comprises two layers of metal cables, FIG. 1f is a cross-section of a pipe or hose similar to that shown in FIG. 5, FIG. 2 shows a layer of cables obtained by calendering, FIG. 3 shows a layer of cables ready to be utilized in the method of manufacturing hoses, sleeves or the like, according to the invention, FIG. 4 shows one part of an undulated hose or pipe comprising cylindrical zones and zones forming a bellows which may be manufactured by the method of the invention, FIG. 5 shows part of an undulated hose or pipe during its manufacture and whose reinforcement is constituted by a single layer of metal cables, FIG. 6 shows part of an undulated hose or pipe during its manufacture by the method of the invention, FIG. 6a is a cross-section along the line b—b of FIG. 6 of the pipe or hose during its manufacture, FIG. 7 shows the same pipe or hose at a stage following the manufacture where two layers of metal cables forming the reinforcement are located in position, and FIG. 7a is a cross-section along the line c—c of the hose or pipe of FIG. 7 during its manufacture.

Referring now to the drawings, the cylindrical hose or pipe 1 shown in FIG. 1 has a reinforcement constituted by a layer of metal cables which have been laid at a predetermined angle of the order of 90° by the method of the invention.

In order to make this and as shown in FIGS. 2 and 3, bands formed from parallel cables embedded in non-vulcanized rubber have been prepared which make with the longitudinal axis of the band an angle equal to the laying angle. In order to make such bands, a layer 2 of longitudinal metal cables may be prepared by calendering and then this layer may be cut into rhomboidal sections 3 along a cutting line which make with the transverse direction an angle $\alpha$ equal to an angle complementary to the laying angle; the sections 3 are then rotated in the same plane by an angle of 90° they need only be placed end to end whereby they will adhere together due to the adhesive properties of the non-vulcanized rubber; there is thus obtained a strip 4 of parallel cables embedded transversely in the rubber and making with its longitudinal axis an angle equal to the laying angle. Such a method of operating is well known in the rubber industry and it is, therefore, not necessary to describe it in greater detail here. The continuous strips thus manufactured as shown in FIG. 3 is cut up longitudinally into reinforcing bands 5 of lesser width.

These bands are located longitudinally and parallel one to the other on a mandrel of appropriate shape covered by a layer of rubber forming a sheath corresponding to the inner layer of the pipe or hose, in such a fashion as to cover the whole of the periphery of the internal coating. It will thus be seen that the reinforcement is no longer constituted by continuous cables; it is thus necessary that the longitudinally located bands be connected together. To this end, the bands are located in such a fashion that they partly cover each other, the extent of the cover being such that, having regard to the adherence between the cables and the rubber used, and the resistance of the vulcanized rubber in which the cables are embedded, the connection between the two superimposed bands is sufficient that the bands should not become separated under any stresses to which the pipe or tube or similar member is submitted.

The bands may be arranged in several ways. In the case of the pipe or hose as shown in FIG. 1, there are placed on the inner layer 6 (FIG. 1a), six identical bands 7 of metal cables distributed around the periphery of said layer; since the bands are separated by empty gaps, bands 7a similar to the bands 7 are located so as to cover the edges of two consecutive bands 7.

Figure 1D:
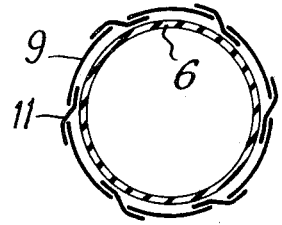

FIGS. 1b, 1c and 1d show other ways of manufacturing a pipe or hose according to the invention. FIG. 1b shows an alternative covering of bands 8 which are applied in the overlapping fashion of tiles: one edge of one band covers the edge of the adjacent band whilst the other edge of the band is covered by the next adjacent band. FIGS. 1c and 1d show assemblies of bands 9 located fairly close together, with further bands 10 or 11 respectively, of lesser width being used as covering joints for connecting the bands 9. These covering joints may be placed either so as to cover the upper face of the two adjacent bands 9 as shown in FIG. 1c or in such a fashion that one of their edges covers the edge of the adjacent band 9, whilst their other edge is covered by the edge of the next adjacent band 9, as is shown in FIG. 1d.

Thus, there may be manufactured by the method of the invention, a pipe or hose comprising two layers or more. To this end, two layers may be formed one after the other, each one of them being made as in the preceding example, but also it is possible, as shown in the embodiment illustrated by FIG. 1e, where the reinforcement is constituted by two crossed layers, simply to juxtapose the bands forming the first layer and then in order to form the second layer, to place identical bands over the first layer, juxtaposing them but in staggered relationship with respect to the bands of the first layer by half of their width.

The reinforcement thus having been made, another rubber layer forming an external covering of the pipe or hose (the cover) is positioned: this is then bound and vulcanized.

The method according to the invention may be carried out to make all kinds of tubular elements of reinforced rubber, particularly when current methods do not allow of the manufacture in an easy fashion; this is the case for example with expanding sleeves and pipes or hoses comprising annular undulations.

FIG. 4 shows a partially cut-away view of part of an undulated pipe or hose for use as a suction tube of a dredger in which each undulation constitutes a bellows for facilitating the curvature of the pipe or hose. The part of the pipe or hose shown comprises two annular undulations or bellows 12 and 13 which enable it to be curved without its useful section varying or which allow it to be subjected to variations in length. In this embodiment, which relates to a pipe or hose capable of being submitted to elevated depressions, the reinforcement is composed of two assemblies of layers 14 and 15 each formed by two crossed layers of parallel metal cables laid at 72°; in the cylindrical zone 16, the reinforcement also includes a rigidifying element 17 formed for example by a metal helically-wound or by annuli constituted by a ribbon of metal having concentric convolutions which are secured together and located between the assemblies of layers 14 and 15.

In this embodiment, the undulations of the bellows are directed towards the outside of the pipe or hose; the method of the invention could also be applied to the case where the undulations are inwardly directed or even if they had another geometrical form.

In order to manufacture such undulated pipes or hoses, the operations are carried out as hereinbefore described. However, since the circumference of the undulations is different from that of the cylindrical zones, between them, the width of the coverings of the bands decrease on the undulations if the latter are directed towards the outside of the pipe or hose and increase if they are inwardly directed. Thus, the procedure may be as is represented in FIG. 5, where the bands of cables 18 are covered sufficiently between themselves on the parts of the pipe or tube having the greater cross-section, the width of covering of the bands thus being greater than is necessary in the parts of smaller section as shown in FIG. 1f reinforcement of the pipe or hose shown in FIG. 4 may be carried out in this manner. However, particularly when the pipe, like that shown in FIG. 4, has a reinforcement that comprises at least two layers, and if it does not have to have a heavy resistance to bursting, it may be accepted that the covering of the bands of one layer shall have discontinuities at the apex of the undulations if these discontinuities in covering of the bands of the other layer do not coincide with those of the first layer.

FIGS. 6 and 6a show such a method of operating; the bands 19 forming the lower layer 15 of the reinforcement are covered by their adjacent edges 19a in the cylindrical zones of the pipe or hose whilst they allow between them a gap 20 at the apex of the undulations, that is to say at the place where the circumference is greater.

Over the bands 19, there are located bands 21 whose cables make with the axial direction an angle equal to but of direction opposite to that which the cables of the bands 19 make with this same direction; on the cylindrical parts of the pipe or hose, bands 21 are covered equally by their edge, but they are staggered with respect to the bands 19 by one half of their width. At the location of the bellows, gaps 22 appear also between the bands 21 but they do not coincide with the gaps 20 of the bands 19 if only because at these places there is always at least one layer of cables.

In order to manufacture the pipe or hose as shown in FIG. 4, after having positioned the inner layer or sheath and having effected the assembly of the layers 15 in the manner described above, there is placed over the whole length of the pipe or hose an intermediate layer 23 of rubber, and rigidifying elements 17 in the cylindrical parts of the pipe or hose and then as hereinbefore described there is produced the assembly of layers 14. Finally, a layer of rubber is applied for forming the exterior layer or cover of the pipe or hose, after which it is bound and then vulcanized.

Experience has shown that the existence of a single layer (FIG. 7a) at certain limited places on the apex of the undulations has no deleterious effect on the good behaviour of the pipe or hose. This apparently is due to the fact that the surface in question are relatively small and that the single layer present at these locations is firmly connected to the other layer.

Experience has also shown that all the pipes or hoses manufactured by this method, in which there are no continuous cables enclosing the whole pipe, have characteristics which are at least as good as those manufactured according to current practice according to which there are cables which continuously surround the whole of the pipe or hose.

In any case, if it is desired to make a hose or pipe which has the same number of layers in the undulated zones as in the cylindrical zones therebetween, it is possible to place, as hereinbefore described, only in certain of these zones (the undulated zones for the pipe as shown in FIG. 4), complementary bands of metal cables.

Thus, in accordance with the method of the invention there was made as a suction pipe for dredging purposes, a flexible hose or pipe of 350 mm. internal diameter and 2.10 m. length comprising 15 belows of 470 mm. external diameter; the reinforcement of this pipe or hose was formed from two assemblies of two crossed layers of metal cables separated one from the other by a layer of rubber as in the embodiment of FIG. 4; the laying angle was 80° on a mandrel of appropriate shape, there was located a rubber layer 8 mm. thick forming the internal layer (sheath) of the pipe or hose; finally, there were placed six identical bands formed by metal cables parallel each to the other embedded in rubber and inclined to the longitudinal direction of these bands at an angle of 80° so as to be simply juxtaposed in the cylindrical zones, whereby gaps remained between them on the upper part of the bellows. Then a second series of six further bands identical to the first ones were positioned, but they were crossed and staggered with respect to the first ones; thus, the junction lines of the bands of the first series and the spaces that they left between them in the undulations were covered by the bands of the second series.

Finally, rigidifying elements were placed in the cylindrical zones and in the same fashion there was produced the other assembly of two crossed layers. After the external layer or coating was placed, the pipe was bound and then vulcanized.

We claim:

1. A method of manufacturing a reinforced hollow tubular member, which method comprises the following steps: (a) taking an extended length of unvulcanized rubber in which is embedded a plurality of longitudinal and mutually parallel cables and cutting said extended length into a plurality of substantially equal bands along lines forming an angle to the edge of said extended length thus defining a sequence of separate rhomboidal sections (b) rotating each of said rhomboidal sections through 90° in the same plane and locating them end to end to form an extended strip in which the individual cables of each said rhomboidal section lie across the longitudinal axis of said strip but making an angle with said longitudinal axis (c) dividing said strip formed in accordance with (b) longitudinally to form reinforcing bands and (d) placing said reinforcing bands in contact with and along the length of a hollow sheath to form a covering layer, each of said bands being parallel to each other and the individual cables in each section of said reinforcing bands thus lying in a helical direction in relation to said hollow sheath.

2. A method according to claim 1 wherein said reinforcing bands are located in spaced-apart relationship and at least one further layer of said reinforcing bands is applied to said sheath over said first mentioned layer, the bands in adjacent layers lying over the gaps between the reinforcing bands of the layer immediately therebeneath.

3. A method according to claim 1 wherein said reinforcing bands are disposed in imbricated fashion like roof tiles.

4. A method according to claim 1, wherein said sheath includes zones of different diameter wherein said reinforcing bands covering those of said zones having the greater diameter are separated by gaps, and wherein the edges of said gaps are covered by additional reinforcing bands.

5. A method according to claim 1 wherein said sheath includes zones of different diameters and wherein said reinforcing bands covering those of said zones of lesser diameter having their edges covered by additional reinforcing bands, so that said edges are covered in those of said zones of greater diameter over at least a minimum width.

References Cited
UNITED STATES PATENTS

| | | | |
|---|---|---|---|
| 3,428,507 | 2/1969 | Ball | 138—133 |
| 817,060 | 4/1905 | Greenfield | 138—133 |
| 1,287,515 | 12/1918 | Tew | 156—174 |

ALFRED L. LEAVITT, Primary Examiner

F. FRISENDA, Jr., Assistant Examiner

U.S. Cl. X.R.

156—174, 187, 215, 255, 265, 290

UNITED STATES PATENT OFFICE
CERTIFICATE OF CORRECTION

Patent No. 3,799,825          Dated March 26, 1974

Inventor(s) JACQUES CHAMPLEBOUX & ROBERT DELAUX

It is certified that error appears in the above-identified patent and that said Letters Patent are hereby corrected as shown below:

[30]     Foreign Application Priority Data

March 1, 1971    France . . . . . 71.07049

Signed and sealed this 17th day of September 1974.

(SEAL)
Attest:

McCOY M. GIBSON JR.             C. MARSHALL DANN
Attesting Officer                Commissioner of Patents